United States Patent
Evans et al.

(10) Patent No.: US 6,978,075 B2
(45) Date of Patent: Dec. 20, 2005

(54) CABLE PROTECTOR FOR CENTRAL OFFICE CABLE RACK

(75) Inventors: Jeffrey Jonathan Evans, Monmouth Junction, NJ (US); Lucius Levear Martin, Elizabeth, NJ (US); Richard D Olah, South Plainfield, NJ (US); George J Ryblewski, Oak Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/852,270

(22) Filed: May 24, 2004

(65) Prior Publication Data

US 2005/0259938 A1  Nov. 24, 2005

(51) Int. Cl.⁷ .................................................. G02B 6/00
(52) U.S. Cl. .................. 385/137; 385/100; 385/134; 385/136; 385/147; 385/135
(58) Field of Search ............................... 385/134, 135, 385/136, 137, 147; 174/70; 211/26

(56) References Cited

U.S. PATENT DOCUMENTS

| 5,640,482 A | * | 6/1997 | Barry et al. ................. 385/135 |
| 6,568,542 B1 | * | 5/2003 | Chen ............................ 211/26 |

FOREIGN PATENT DOCUMENTS

| JP | 10047547 A | * | 2/1998 | ............. F16L 3/24 |

* cited by examiner

*Primary Examiner*—Frank G. Font
*Assistant Examiner*—Mary El-Shammaa
(74) *Attorney, Agent, or Firm*—Stephen M. Gurey

(57) ABSTRACT

A cable protector in a telecommunications central office protects cables from damage from contact with cable racks as the cables are pulled from bay to bay. The cable protector is a cardboard-like fiber material that is folded into a planar portion that is dimensioned to fit over the top of the cable rack, and integral side flaps that are each folded into V-shaped channels and serve to grip the sides of the cable rack and hold the protector in place when the protector is placed over the top of the rack.

2 Claims, 3 Drawing Sheets

CABLE PROTECTOR FOR CENTRAL OFFICE CABLE RACK

TECHNICAL FIELD

This invention relates to cable protectors for cable racks in telecommunications central offices.

BACKGROUND OF THE INVENTION

In telecommunications central offices, sheathed optical and/or metallic cables are routed from bay to bay in the office via cable racks, which are used to support the cables and enable a vertically-oriented cable to be redirected in a horizontal direction or vice versa. A cable rack generally includes a horizontally oriented beam that is made of steel or other strong material. A cable, as it is being routed from one bay to another either is pulled horizontally across the top surface of the cable rack beam and then down the side of the beam, or is pulled vertically up the side of the beam and then horizontally across the top surface of the beam. The cable rack beam on which multiple sheathed cables are supported generally has a rectangular or squared cross-section, somewhat approximating an inverted and squared "U", and as such has sharp edges along its length between its top and side surfaces which could damage the cable sheathing as the cable is pulled across them from bay to bay. In order to protect and prevent damage to the cables, before pulling any cables, central office installers wrap the cable with a flexible cardboard-like fiber material, such as Voltoid V-090 electrical barrier material available from Interface Solutions, Inc. of Northville, Mich. In wrapping the cable rack, the installer cuts an appropriate length from a roll of the material, wraps the cut length of the material around the beam, and then secures the material in place around the cable rack using flexible straps or other tying arrangements. By interposing this material around the cable rack, damage to the cables can be minimized as the cables are pulled over it. FIG. 1 illustrates a prior art fiber-wrapped cable. The cable rack beam 101 is shown wrapped in the fiber material 102, which has been cut to length and held in place with straps 103 whose ends are tied together. The sheathed cables 104 are shown disposed on the wrapped cable rack.

Disadvantageously, cutting the fiber material to an appropriate length, wrapping the cut fiber material around the beam, and securing to the cable rack is time consuming and an inefficient use of the central office installer's time.

SUMMARY OF THE INVENTION

In accordance with an embodiment of the present invention, a cable protector is folded it out of a fiber material and dimensioned to fit over and clip onto a cable rack. The installer needs only to place a protector in accordance with the present invention onto the top surface of the cable rack and push it downward onto the rack to secure it in place. The cable rack is then ready for cables to be drawn and routed over it. The prior art procedures of cutting the protective fiber material to size and securing it to the cable rack beam are thereby eliminated. In an embodiment of the invention, an essentially planar portion of the protector is dimensioned in width to the depth dimension of the cable rack. Integral with and part of the planar portion are flap portions of the fiber material that serve both to provide cushioning of the sheathed cables when they are disposed across the cable rack to prevent abrasive damage, and to clip the protector onto the cable rack by means of the compressive force exerted onto the sides of the cable rack by the flap portions due to the elasticity of the material that comprises the protector. In an embodiment of the invention, the each flap portion is pre-folded and formed from the fiber material into what in cross-section is a folded "V", wherein the inner-facing leg of each V-flap compressively grips the side of the cable rack to keep the protector in place.

DETAILED DESCRIPTION

Figure 1:
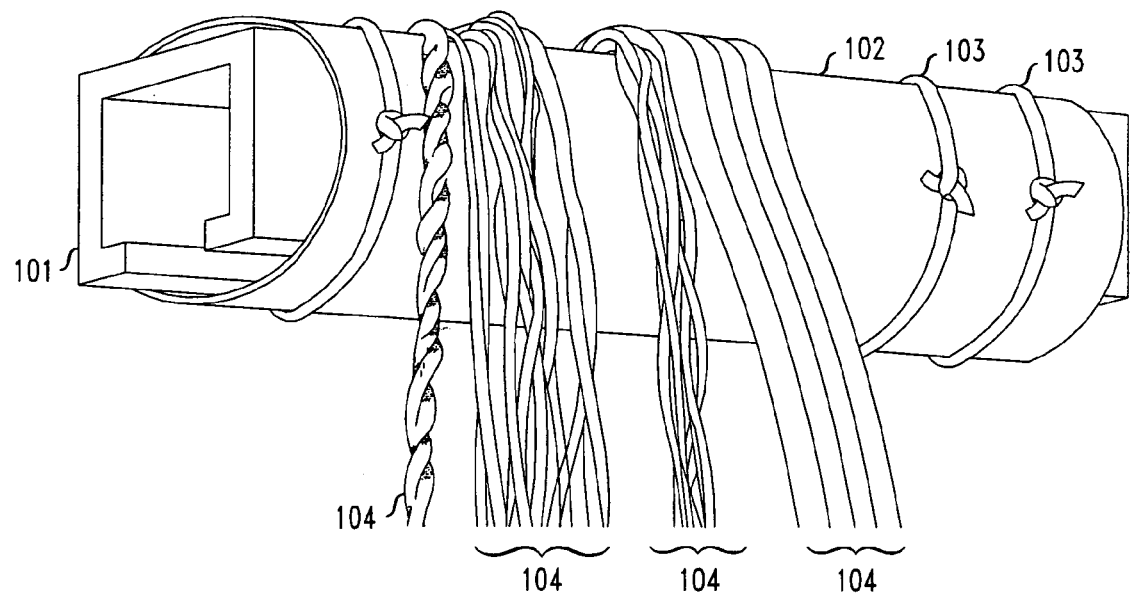
FIG. 1 shows a prior art arrangement for protecting sheathed optical and electrical cables against abrasive damage as they are pulled across cable racks in central offices.
Figure 2:
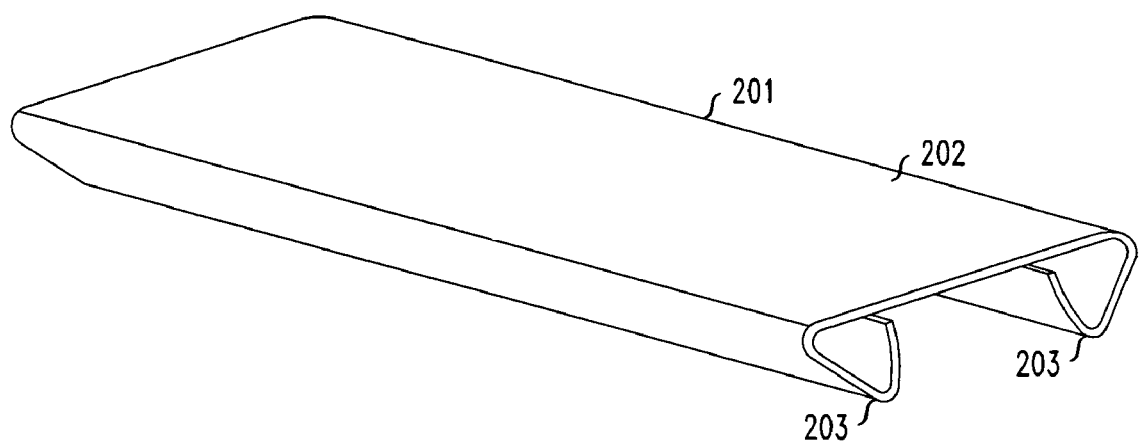
FIG. 2 shows a perspective view of a cable protector in accordance with an embodiment of the present invention.
Figure 3:
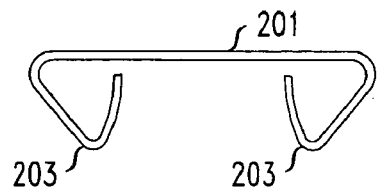
FIG. 3 shows a cross-sectional view of the cable protector of FIG. 2.
Figure 4:
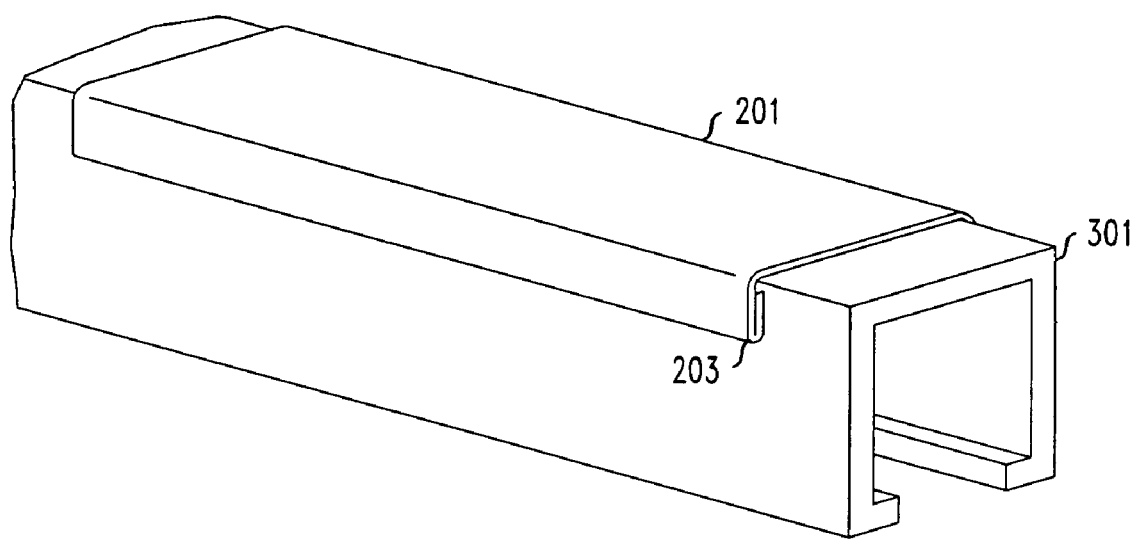
FIG. 4 shows a perspective view of the cable protector of FIG. 2 disposed on a cable rack.
Figure 5:
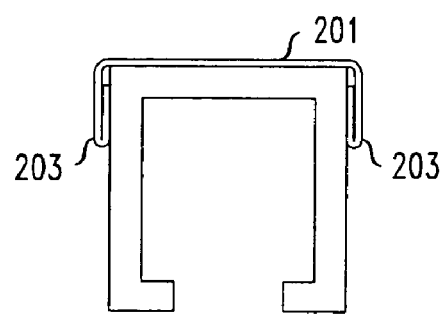
FIG. 5 shows a cross-sectional view of the cable protector of FIG. 2 as disposed on a cable rack.

With reference to the perspective view of FIG. 2, the cross-sectional view of FIG. 3, the perspective view of FIG. 4, and the cross-sectional view of FIG. 5, an embodiment of a cable protector in accordance with the present invention is illustrated. The same numerical legends are used for elements commonly visible in more than one figure. The cable protector 201 is made from a single sheet of a flexible cardboard-like fiber material such as the afore-noted Voltoid V-090 electrical barrier material. That material is composed of a blend of organic and inorganic fibers, inorganic fillers, and bound in a latex matrix and has a minimum tensile strength of 1150 psi. The Voltaid V-090 material, however, does not have to be the material from which the cable protector is formed. Whatever material is used, however, should have sufficient tensile strength, a modulus of elasticity, and a modulus of rigidity such that the material is capable of maintaining the shape into which it is formed and returning to its natural elastic state after an applied force is removed. Materials that have these desired properties are well known to those skilled in the art. A planar sheet of the fiber material is folded into the illustrated shape either manually or automatically using a folding machine. In folding the fiber material into the desired and illustrated shape, the cable protector is shaped and dimensioned to fit over and clip onto a cable rack 301, shown in FIG. 3. To that end, the protector 201 has a substantially planar portion 202 having a width approximately equal to the depth of the cable rack onto which it is adapted to be disposed. Integral to and part of the cable protector 201 are two flaps 203, which, when the cable protector is disposed on the cable rack and cables are disposed thereon, protect the sheathed cables from coming in contact with the sharp edges of the cable rack, as well as gripping the protector onto the cable rack. As shown in FIGS. 2–5, each flap 203 is folded substantially in half, forming a folded "V" channel that extends lengthwise down the each side of the planar portion 202 of the protector. When the protector 201 is disposed on the cable rack 301, as shown in FIGS. 4 and 5, the sides of each V-shaped flap are compressed together so that the forces created as a result of the rigidity and elasticity of the protector material causes interior protector to grip onto the sides of the cable rack and hold the protector in place on the rack.

Advantageously, the preformed cable protector can be easily clipped into place onto the cable rack by the central office installer before the sheathed cables are pulled across the rack in the central office. The installer thus need not spend time cutting and tying fiber sheets around the cable rack and can perform his installation procedures in a more efficient manner. The cable protector can be dimensioned in length to a standard cable rack width or can be made available to installers in a variety of lengths for different central office installation scenarios.

Although shown as having V-shaped flaps, other flap arrangements can be used that jointly perform the function of forming a protective barrier between the cable rack and the sheathed cables, as well as providing a clipping mechanism for holding the protector in place on the cable rack. For example, depending on the elasticity and rigidity of the material used for the cable protector, each flap portion could simply comprise a single legged flap that fits over and clips onto the sides of the cable rack. Also, the length of either a single-leg flap or the V-shaped flaps illustrated in FIGS. 2–5 can be an adjustable design parameter that enables the flap to extend over the full height of the cable rack at one extreme, but need only be long enough so as to cover the corner of the cable rack while still providing sufficient side contact with the cable rack to enable it to clip onto and remain in place on the cable rack.

The above-described embodiment is illustrative of the principles of the present invention. Those skilled in the art could devise other embodiments without departing from the spirit and scope of the present invention.

What is claimed is:

1. A cable protector for a cable rack, the cable rack being a squared beam having a planar top surface of predetermined depth and planar side surfaces and having edges running along the intersection of the planar top surface and the planar side surfaces, the cable rack being designed to support at least one cable when it is disposed above and across the planar top surface, the protector comprising:

a folded cardboard-like fiber material having an essentially planar portion dimensioned in width to the depth of the cable rack; and first and second flap portions each integral to and on opposite sides of the planar portion, wherein the fiber material has sufficient rigidity and elasticity so that flap portions are adapted to hold the folded material onto the cable rack when the protector is disposed on the rack, wherein when it is disposed on the cable rack the protector protects the cable by preventing the cable from coming into direct contact with the edges of the cable rack.

2. The cable protector of claim 1 wherein the flap portions are folded to form V-shaped channels that function to compressively grip the side surfaces of the cable rack when the protector is disposed on the rack.

* * * * *